(12) United States Patent
Holten et al.

(10) Patent No.: US 9,423,101 B2
(45) Date of Patent: Aug. 23, 2016

(54) LIGHTING DEVICE HAVING A LENS INCLUDING A PLURALITY OF INTERCONNECTED ELONGATED LIGHT-GUIDING ELEMENTS

(75) Inventors: Petrus Adrianus Josephus Holten, Aalten (NL); Giorgia Tordini, Lyons (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 7 days.

(21) Appl. No.: 13/391,300

(22) PCT Filed: Aug. 12, 2010

(86) PCT No.: PCT/IB2010/053647
§ 371 (c)(1),
(2), (4) Date: Feb. 20, 2012

(87) PCT Pub. No.: WO2011/021135
PCT Pub. Date: Feb. 24, 2011

(65) Prior Publication Data
US 2012/0147621 A1 Jun. 14, 2012

(30) Foreign Application Priority Data
Aug. 19, 2009 (EP) .................................... 09168138

(51) Int. Cl.
*F21V 7/00* (2006.01)
*F21V 5/00* (2015.01)
*F21V 8/00* (2006.01)

(52) U.S. Cl.
CPC ................. *F21V 7/0091* (2013.01); *F21V 5/00* (2013.01); *G02B 6/0001* (2013.01); *G02B 6/0075* (2013.01)

(58) Field of Classification Search
CPC .. F21V 7/0091; G02B 6/0075; F21S 48/2262
USPC .......................................................... 362/551
See application file for complete search history.

(56) References Cited

U.S. PATENT DOCUMENTS 4,811,172 A * 3/1989 Davenport ........... B60Q 1/0011
362/511
5,692,827 A * 12/1997 Chinniah et al. ............... 362/522
6,361,192 B1 3/2002 Fussell et al.
(Continued)

FOREIGN PATENT DOCUMENTS

CN 1749823 A 3/2006
EP 2009345 A2 12/2008
(Continued)

*Primary Examiner* — Anh Mai
*Assistant Examiner* — Zachary J Snyder
(74) *Attorney, Agent, or Firm* — Meenakshy Chakravorty

(57) ABSTRACT

A lighting device (1) comprises a light source (2) and a lens (3, 23, 33, 43, 53, 63) positioned in front of the light source (2). The lens (3, 23, 33, 43, 53, 63) is provided with a light entrance surface on a side facing the light source (2) and a light exit surface (14, 38) on a side remote from the light source (2). The lens (3, 23, 33, 43, 53, 63) comprises a number of strip-shaped interconnected elongated light guiding elements (4, 24, 34, 54, 64), of which first ends (7, 27, 37, 57) and spaced apart second ends (5, 25, 35, 55, 65) comprise the light entrance surface and light exit surface, respectively. Light beams emitted by the light source (2) are transmitted by total internal reflection in the elongated light guiding elements (4, 24, 34, 54, 64) from the first ends (7, 27, 37, 57) to the spaced apart seconds ends (5, 25, 35, 55, 65).

8 Claims, 5 Drawing Sheets

(56) References Cited

U.S. PATENT DOCUMENTS

| | | | | |
|---|---|---|---|---|
| 6,443,582 B1 * | 9/2002 | Tarne | ............... | F21S 48/215 362/23.01 |
| 6,789,929 B1 | 9/2004 | Doong et al. | | |
| 6,814,479 B2 * | 11/2004 | Aynie et al. | ............ | 362/511 |
| 6,924,943 B2 | 8/2005 | Minano et al. | | |
| 7,128,431 B2 * | 10/2006 | Ludewig | .......... | G02B 6/04 362/23.09 |
| 7,290,906 B2 * | 11/2007 | Suzuki et al. | .......... | 362/511 |
| 7,600,905 B2 * | 10/2009 | Geiger | ............ | B60Q 1/2665 362/494 |
| 7,670,039 B2 * | 3/2010 | Altonen | ............ | G02B 6/0001 200/314 |
| 7,837,364 B2 * | 11/2010 | Budinger | ............ | B60Q 3/0253 362/470 |
| 2006/0007692 A1 | 1/2006 | Hsien | | |
| 2006/0198158 A1 * | 9/2006 | Nagabuchi | ............ | 362/511 |
| 2007/0019429 A1 * | 1/2007 | Gasquet | ............ | 362/510 |
| 2007/0121331 A1 | 5/2007 | Chinniah et al. | | |
| 2007/0126994 A1 * | 6/2007 | Hwang | ............ | 353/94 |
| 2007/0216318 A1 | 9/2007 | Altonen et al. | | |
| 2008/0106903 A1 * | 5/2008 | King | ............ | 362/308 |
| 2008/0247176 A1 | 10/2008 | Chen | | |
| 2009/0135625 A1 | 5/2009 | Yang et al. | | |
| 2011/0257484 A1 * | 10/2011 | Mizuyoshi | ............ | A61B 1/0684 600/178 |

FOREIGN PATENT DOCUMENTS

| | | |
|---|---|---|
| JP | 2006244923 A | 9/2006 |
| JP | 2007035626 A | 2/2007 |
| JP | 2008199555 A | 8/2008 |
| JP | 2009016347 A | 1/2009 |
| JP | 2009523303 A | 6/2009 |

* cited by examiner

LIGHTING DEVICE HAVING A LENS INCLUDING A PLURALITY OF INTERCONNECTED ELONGATED LIGHT-GUIDING ELEMENTS

FIELD OF THE INVENTION

The invention relates to a lighting device comprising a light source and a lens positioned in front of the light source, which lens is provided with a light entrance surface on a side facing the light source and a light exit surface on a side remote from the light source.

The invention also relates to a lens.

BACKGROUND OF THE INVENTION

Such a lighting device, which is known from EP 2009345 A2, comprises a lens having a first optical refractive element arranged around a peripheral edge and a second optical refractive element centrally located on the lens. Between the light source, such as a light emitting diode (LED), and the lens a reflector is located. A forward emitted portion of the light of the LED goes directly to the lens whilst a sideward emitted portion is reflected by the reflector before it goes to the lens.

A disadvantage of this known lighting device is that the perceived luminance of the lens is of the same order as the luminance of the light source. In the case of a high power LED an intense and blinding light will be emitted by the lighting device.

The use of such a lighting device with high power LEDs for general indoor lighting is difficult because of the extreme high luminance of the LED. In order to avoid direct exposure of the observer to the high luminance of the LED, luminance transformers may be added. However, such luminance transformers have the disadvantage that they lead to a decrease of the optical efficiency and an increase of the costs of the lighting device.

SUMMARY OF THE INVENTION

It is an object of the invention to provide a lighting device with a simple structure, a relatively high optical efficiency and luminance transformation to avoid glare.

This object is accomplished with the lighting device according to the invention in that the lens comprises a number of strip-shaped interconnected elongated light guiding elements, of which first ends and spaced apart second ends comprise the light entrance surface and light exit surface, respectively, and light beams emitted by the light source are transmitted by total internal reflection in the elongated light guiding elements from the first ends to the spaced apart second ends.

Due to the strip-shaped elongated light guiding elements and the spaced apart second ends, a lens with an open structure is obtained. Owing to the strip-shaped elongated light guiding elements, the length in a first direction from the first end to the second end is in the same order or much smaller as the length of the elongated light guiding elements in a second direction perpendicular to the first direction. The open structure provides a relatively large light exit surface compared to the light entrance surface. The brightness of the light source is distributed over a relatively large light exit surface, whereby the observed brightness is strongly reduced. Light beams from the light source are transmitted by total internal reflection, due to which a high optical efficiency of the lens is obtained. Lighting devices with such a lens are applicable for a wide range of indoor and outdoor applications.

An embodiment of the lighting device according to the invention is characterized in that at least the strip-shaped second ends of the elongated light guiding elements extend parallel to each other.

In this manner, the light exit surface will have a rectangular shape due to which the light emitted by the lighting device may look similar to the light emitted by elongated fluorescent tubes.

Preferably, the elongated light guiding elements extend parallel to each other from the first ends to the second ends, which makes it possible to manufacture the lens by means of extrusion, so that a relatively large length in the second direction perpendicular to the first direction from the first end to the second end can be achieved.

A device with such a lens is suitable as a light line for shop lighting or a light line for a bus, train or airplane, or tunnel lighting. Such a lens is also suitable for a waterproof luminaire, since only the small entrance area where the LED or the LEDs are located, must be waterproof, together with both side ends.

Another embodiment of the lighting device according to the invention is characterized in that at least the second ends of the elongated light guiding elements are ring-shaped strips located concentrically with respect to each other.

In this manner, the light exit surface will have a cylindrical shape due to which the light emitted by the lighting device may look similar to the light emitted by incandescent light bulbs.

Preferably, the elongated light guiding elements are ring-shaped from the first ends to the second ends, such that each elongated light guiding element is cup-shaped.

A device with such a lens is suitable for home lighting, or as a downlighter for office lighting or shop lighting.

Yet another embodiment of the lighting device according to the invention is characterized in that at least a part of the elongated light guiding elements are at least connected to each other near the first and/or second ends.

A continuous light entrance surface and/or exit surface can thus be obtained, providing the lens with a smooth appearance. The areas where the elongated light guiding elements are interconnected are preferably as small as possible to prevent disturbance of the total internal reflection in the elongated light guiding elements.

Another embodiment of the lighting device according to the invention is characterized in that the area of the light exit surface of the lens is at least 100 times and preferably at least 10,000 times larger than the light emitting area of the light source.

Due to the enlargement of the light exit surface with respect to the light emitting surface of the light source, a decrease in perceived luminance is obtained. Depending on the desired luminance, the ratio between light entrance surface and light emitting surface is chosen as well as the number and shape of the elongated light guiding elements.

Another embodiment of the lighting device according to the invention is characterized in that a surface of the first end of the elongated light guiding element extends substantially perpendicularly to the light beams of the light source directed towards said elongated light guiding element.

All light emitted by the light source towards an elongated light guiding element will enter the elongated light guiding element so that the optical efficiency will be optimal.

Yet another embodiment of the lighting device according to the invention is characterized in that the light exit surface has an oblique, convex or concave shape.

The shape of the light exit surface further improves the light emitted by the lighting device, the visual appearance thereof, and determines to a large extent the beam pattern emerging from the lighting device. This is of particular interest for applications in which beam control is important, for example in automotive headlight systems, for example for generating a dim light beam.

Another embodiment of the lighting device according to the invention is characterized in that the lens is made of acryl, polycarbonate or other transparent material.

From such materials relatively cheap lenses can easily be produced.

Another embodiment of the lighting device according to the invention is characterized in that the lens is made by injection moulding or extrusion.

Such a manufacturing process is relatively easy. In the case of injection moulding, the lens can be assembled out of several parts to avoid draft angle problems.

BRIEF DESCRIPTION OF THE DRAWINGS

The invention will be explained in more detail with reference to the drawing, in which.

DETAILED DESCRIPTION OF EMBODIMENTS

Figure 1A:
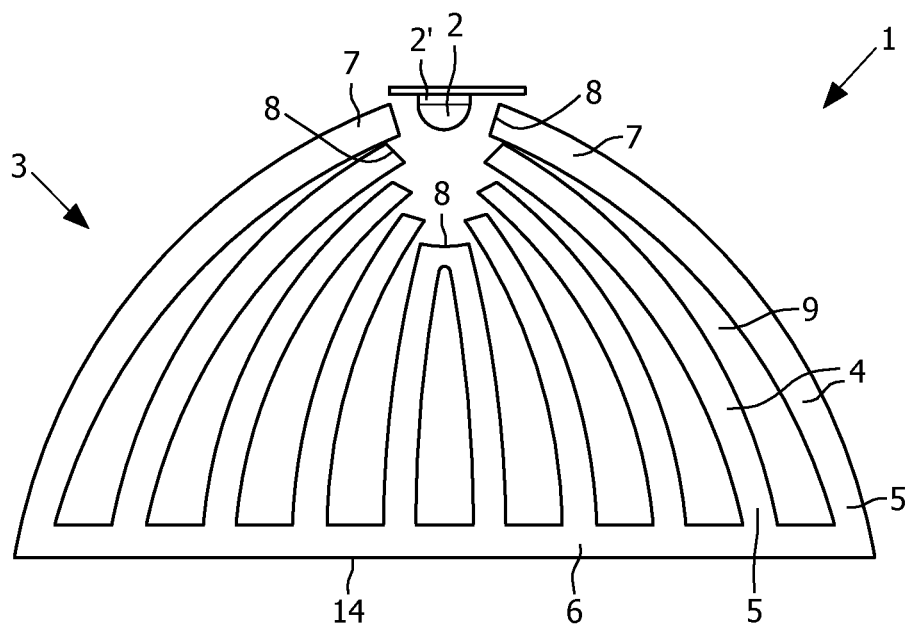
FIGS. 1A and 1B are, respectively, a cross sectional view and a perspective top view of a first embodiment of the lighting device according to the invention.

In the Figures, like parts are indicated by the same reference numerals.

Figure 1B:
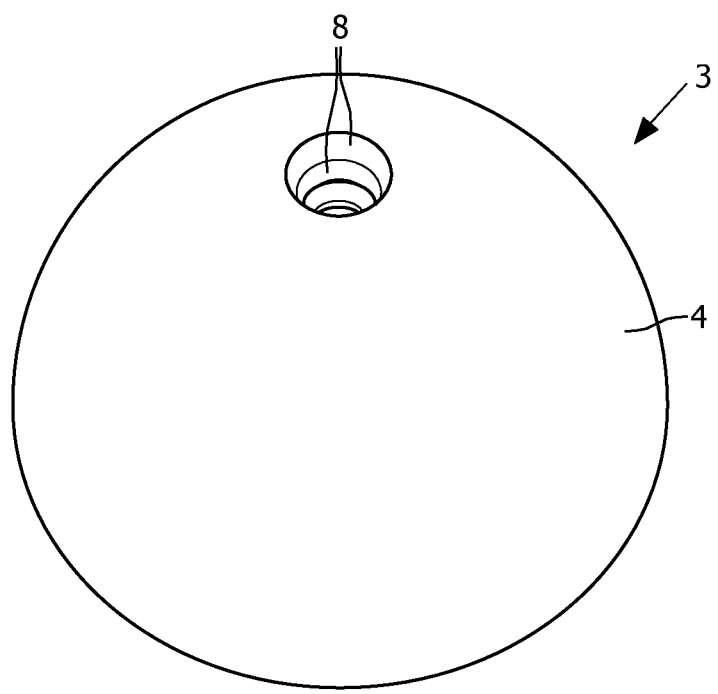
Figure 2:
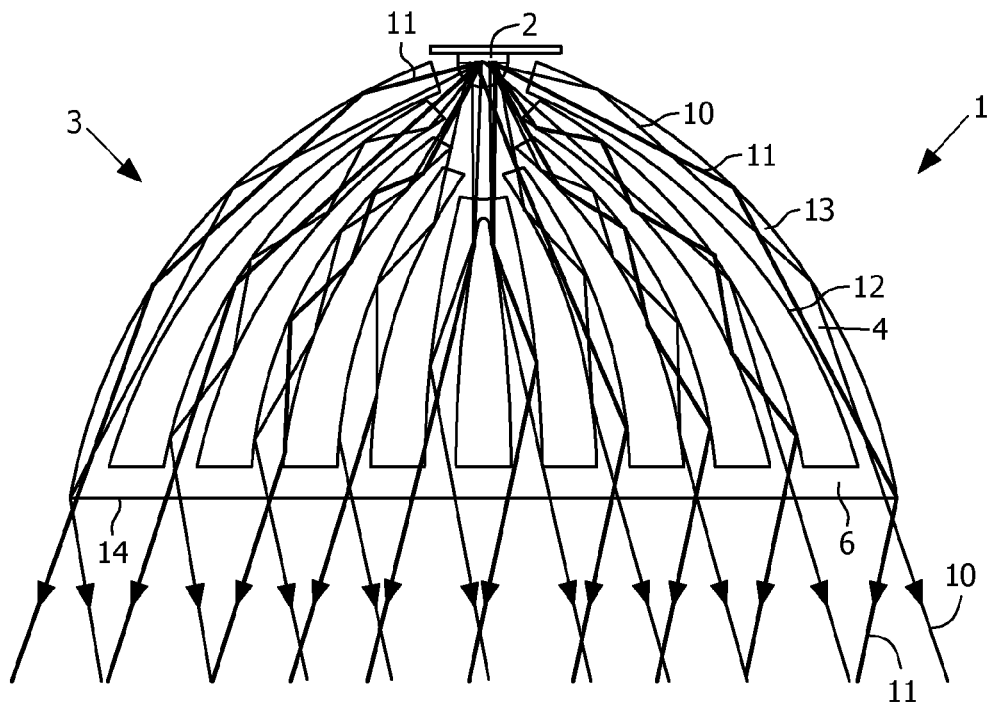
FIG. 2 is a cross sectional view of the lens of the lighting device as shown in FIG. 1, with light beams emitted by the light source and internally reflected by elongated light guiding elements of the lens.

FIGS. 1A, 1B and 2 show a first embodiment of a lighting device 1 according to the invention. The lighting device 1 comprises a high power LED 2 as light source and a lens 3. The lens 3 comprises a number of elongated light guiding elements 4 which are interconnected near spaced apart second ends 5 by means of a plate 6. First ends 7 of the elongated light guiding elements are located near the LED 2. The first ends 7 are spaced apart, such that the distance between the first ends 7 is much smaller than the distance between the second ends 5 at the plate 6. The elongated light guiding elements 4 are cup-shaped, such that both the first ends 7 and the second ends 5 form ring-shaped strips. The first ends 7 of the elongated light guiding elements 4 are each provided with a light receiving surface 8. The light receiving surfaces 8 of all the elongated light guiding elements 4 form a light entrance surface of the lens 3. The light receiving surfaces 8 are located with respect to each other in a manner such that all light beams of the LED 2 will enter one of the light receiving surfaces 8 and no light beam will enter an opening 9 between the elongated light guiding elements 4. Preferably, each light receiving surface 8 extends substantially perpendicularly to the light beams entering said light receiving surface 8. The two centrally located elongated light guiding elements 4 are connected to each other with their second ends 7, however just beyond the first ends 7 the elongated light guiding elements 4 are spaced apart. Between the elongated light guiding elements 4 openings 9 are present which become wider in a direction away from the LED 2. The strip-shaped elongated light guiding elements 4 are relatively long in a direction from the LED 2 towards the plate 6 and in a circumferential direction. The elongated light guiding elements 4 are curved and dimensioned so that a light beam 10, 11 entering the light receiving surface 8 will be totally reflected inside the elongated light guiding element 4 by inner and outer surfaces 12, 13 of the elongated light guiding element 4 until the light beam 10, 11 reaches the second end 5 of the elongated light guiding element 4 and leaves the second end 5 through the light exit surface 14 of the plate 6.

Due to the elongated light guiding elements 4, the curved form thereof and the openings 9 between the elongated light guiding elements 4, the light exit surface 14 of the plate 6 interconnecting the second ends 5 of the elongated light guiding elements 4 is much larger than the light entrance surface as formed by the light receiving surfaces 8 of the elongated light guiding elements 4. Preferably, the light exit surface 14 is at least 100 times and more preferably at least 10,000 times as large as the light emitting surface 2' of the LED 2. The light emitting surface 2' of the LED 2 is for example 1×1 mm to 3×3 mm and the luminance is for example $10^7$ cd/m². Preferably, the perceived luminance should be in the order of $10^4$ cd/m² to $5\times10^4$ cd/m². The light exit surface of the lens should therefore preferably be in de order of $5\times10^{-4}$ m² to $10^{-2}$ m². The number of elongated light guiding elements 4 is preferably at least 3 and at the most 50. The luminance of the LED 2 is strongly fragmented and a much lower luminance is perceived by the observer. However, due to the total internal reflection the optical efficiency of the lens 3 is high and nearly no light is lost.

The lens 3 is made of acryl, polycarbonate or other transparent material and is preferably made by injection moulding. It can be made out of several parts to overcome draft angle problems during the injection moulding process.

Figure 3:
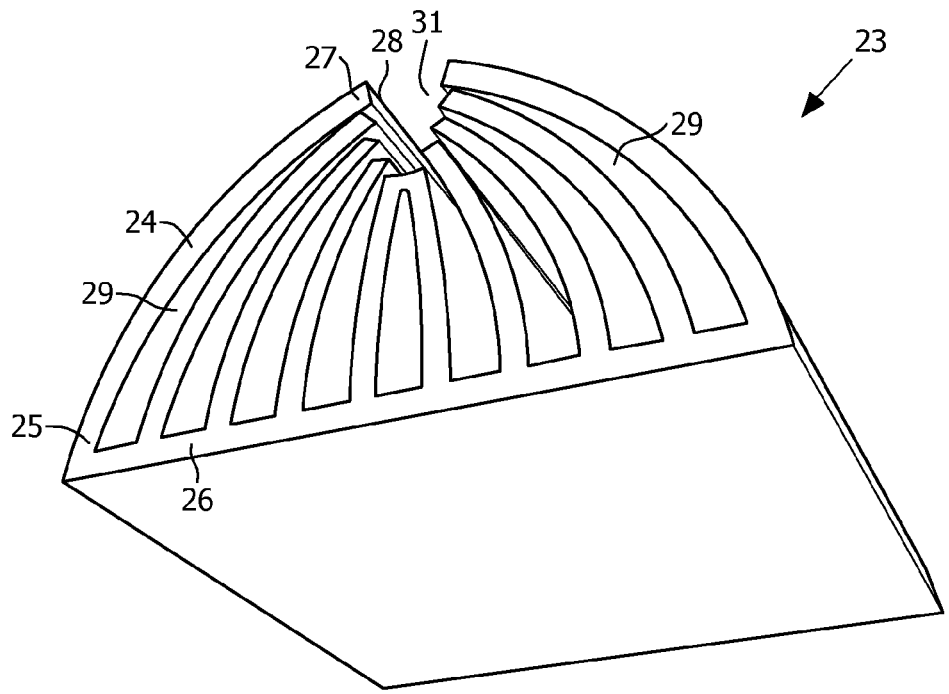
FIG. 3 is a perspective view of a second embodiment of the lighting device according to the invention.

FIG. 3 shows a second embodiment of a lens 23 of a lighting device according to the invention. The lens 23 has a similar cross section as the lens 3 and as shown in FIG. 1. However, instead of a round shape, the lens 23 has a more rectangular shape. The lens 23 comprises a number of strip-shaped elongated light guiding elements 24 extending parallel to each other. The elongated light guiding elements 24 are interconnected near second ends 5 by means of a rectangular plate 26. First ends 27 of the elongated light guiding elements 24 are located near a passage 31 into which a number of LEDs 2 can be positioned in a row or array. The first ends 27 are spaced apart, the distance between the first ends 27 being much smaller than the distance between the second ends 25, i.e. at the location where the second ends enter the plate 26. The first ends 27 of the elongated light guiding elements 24 are each provided with a light receiving surface 28, the light receiving surfaces 28 of all the elongated light guiding elements 24 thus forming a light entrance surface of the lens 23. The light receiving surfaces 28 are located with respect to each other in a manner such that all light beams of the LEDs 2 will enter one of the light receiving surfaces 28 and that no light beam will enter an opening 29 between the elongated light guiding elements 24.

Light beams of the row of LEDs in the passage 31 will be guided by total internal reflection through the elongated light guiding elements 24 in a manner as shown in FIG. 2. The lens 23 can be made by means of extrusion so that a relatively long lens of for example 1 meter in the extrusion direction can be obtained. Such a lens can be used for a lighting device for a bus, train, airplane or parking garage, for example.

The total light emitting surface of the row or array of LEDs 2 is the sum of the light emitting surfaces 2' of all the LEDs 2. Preferably, the light exit surface of the lens 23 at the plate 26 is at least 100 times and more preferably at least 10,000 times as large as the total light emitting surface of the LEDs 2.

Other shapes of lenses can be made by milling the outer surface of the lens 23.

Figure 4:
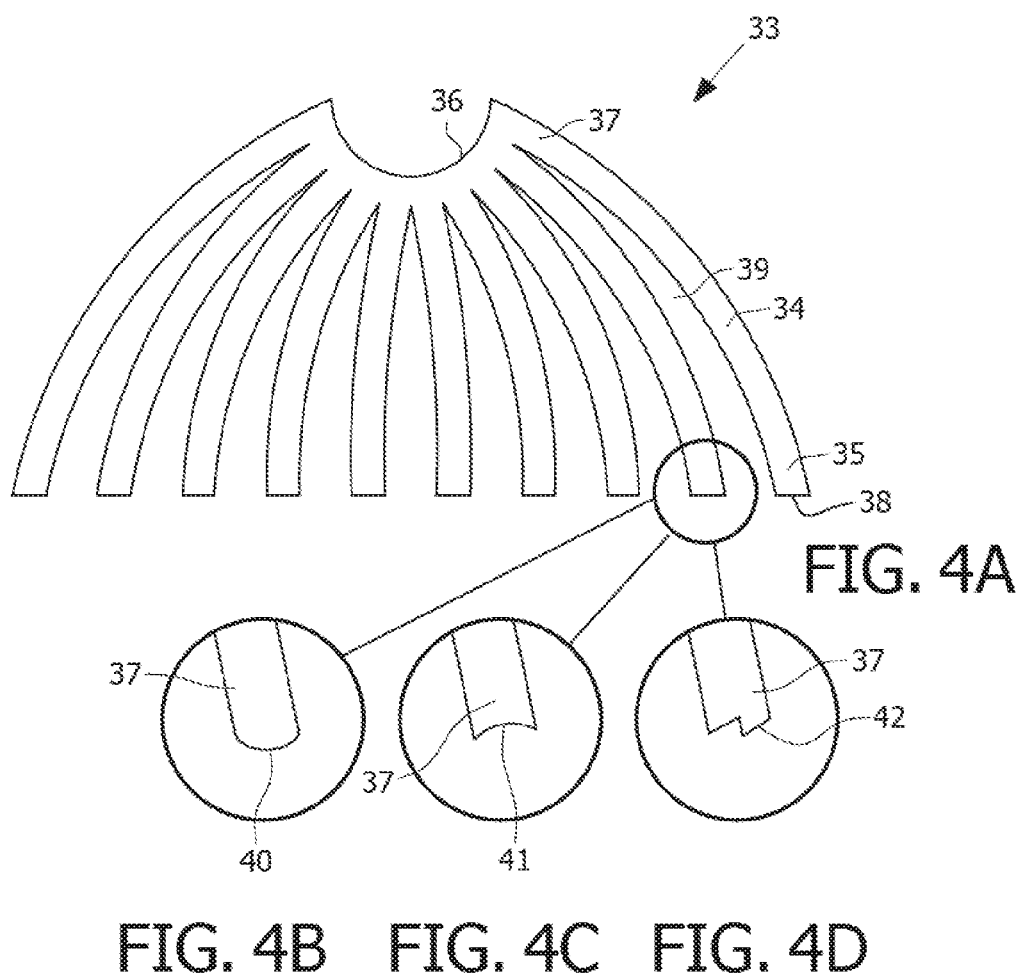
FIG. 4A is a cross section of a third embodiment of the lighting device according to the invention.
FIGS. 4B, 4C and 4D are different embodiments of second ends of the elongated light guiding elements.
Figure 5:
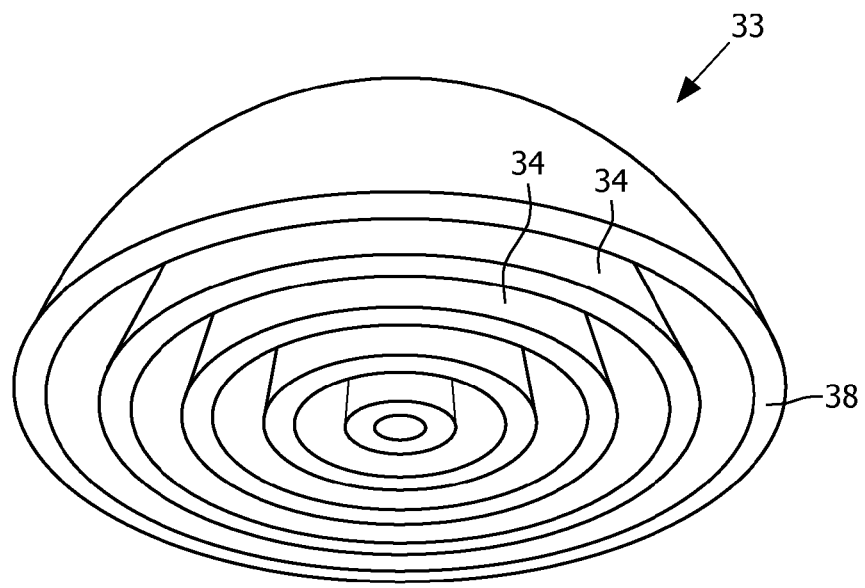
FIG. 5 is a perspective bottom view of the third embodiment of the lighting device as shown in FIG. 4A.

FIGS. 4A and 5 show a third embodiment of a lens 33 of a lighting device according to the invention. The lens 33 comprises cup-shaped curved elongated light guiding elements 34. First ends 37 of the elongated light guiding elements 34 are located against each other and form a light entrance surface 36. Second ends 35 of the elongated light guiding elements 34 are spaced apart, such that the distance between the second ends 35 is much larger than the distance between the first ends 37. Between the elongated light guiding elements 34 openings 39 are located. Near the second ends 35 the elongated light guiding elements 34 are provided with light exit surfaces 38, such that the light exit surface of the lens 33 is formed by the area in which the light exit surfaces 38 are located. The area of the light entrance surface 36 is much smaller than the area of the light exit surface 38 of the lens 33 due to which the perceived luminance of the lighting device is much lower than the luminance of the LED 2 positioned opposite the light entrance surface 36. The second ends 35 of the elongated light guiding elements 34 can be provided with a convex light exit surface 40, a concave light exit surface 41 or an oblique light exit surface 42 as shown in FIGS. 4B, 4C, 4D, respectively, to amend the emitted light as desired.

Figure 6:
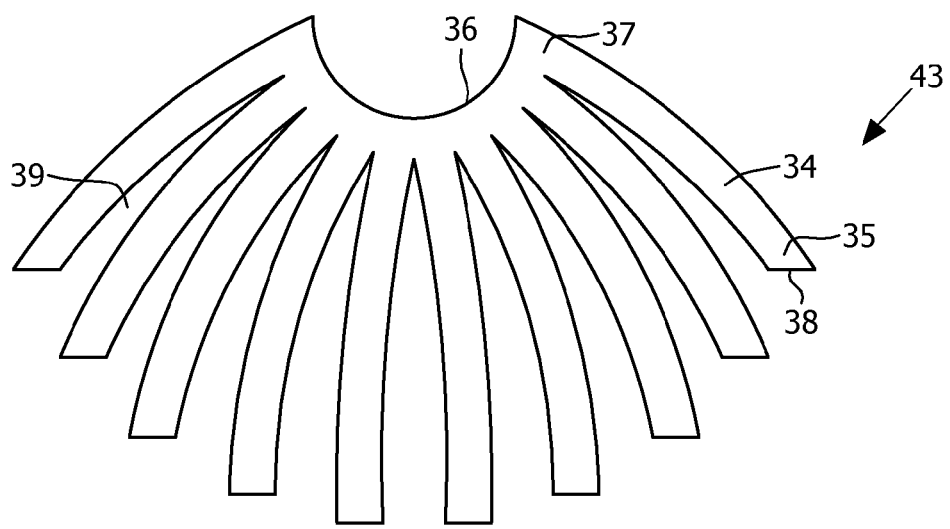
FIG. 6 is a cross section of a fourth embodiment of the lighting device according to the invention.

FIG. 6 shows a fourth embodiment of a lens 43 of a lighting device according to the invention. The lens 43 differs from the lens 33 in that the second ends 35 are located in a convex plane rather than in a common flat plane.

Figure 7:
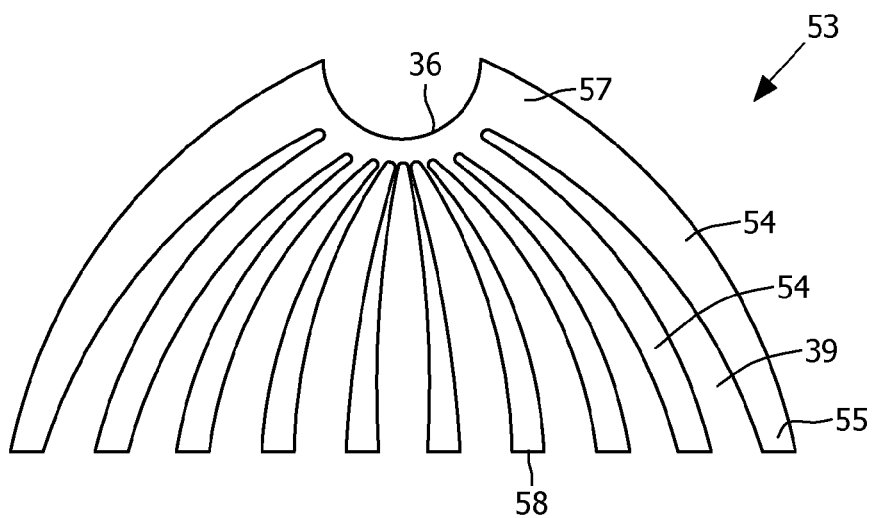
FIG. 7 is a cross section of a fifth embodiment of the lighting device according to the invention.

FIG. 7 shows a fifth embodiment of a lens 53 of a lighting device according to the invention. The lens 53 differs from the lens 33 in that the thickness of the elongated light guiding elements 54 near the first ends 57 is larger near the outside of the lens 54 than near the inside, whilst the thickness near the second ends 55 of all elongated light guiding elements 54 is equal.

Figure 8:
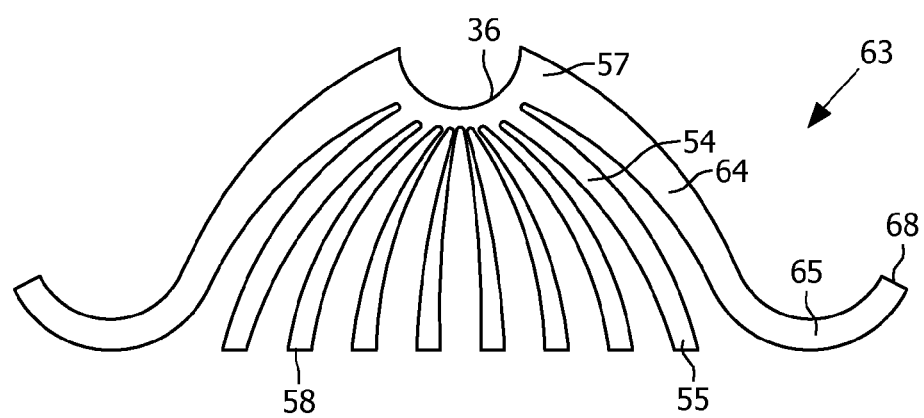
FIG. 8 is a cross section of a sixth embodiment of the lighting device according to the invention.

FIG. 8 shows a sixth embodiment of a lens 63 of a lighting device according to the invention. The lens 63 differs from the lens 53 in that the second end 65 of the outer cup-shaped elongated light guiding element 64 is flared so that the light exit surface 68 thereof faces away from the light exit surfaces 58 of the other elongated light guiding elements 54.

It is also possible to manufacture a more rectangular lens, such as shown in FIG. 3 with a cross section as shown in FIG. 6, 7 or 8.

It is also possible to extend the outer elongated light guiding elements 34 so that the second ends are located in a convex plane, a rippled plane or any differently shaped plane.

It is also possible to provide the light exit surface of the elongated light guiding element with a micro structure, such as a frosted structure or diffusion structure, to further improve the light distribution.

It is also possible to connect the elongated light guiding elements to each other somewhere between the first and second ends either by a light guiding material, an opaque material or a holder.

Preferably, the elongated light guiding elements are rigid. However, it is also possible to manufacture flexible elongated light guiding elements so that the position of the light exit surface of each elongated light guiding element can be amended as desired.

The invention claimed is:

1. A lighting device comprising:
a light source; and
a lens positioned in front of the light source, the lens comprising a light entrance surface on a side facing the light source and a light exit surface on a side remote from the light source, and further comprising a plurality of strip-shaped interconnected elongated light guiding elements, of which first ends and spaced apart second ends comprise the light entrance surface and light exit surface, respectively, and light beams emitted by the light source are transmitted by total internal reflection in the elongated light guiding elements in a first direction from the first ends to the spaced apart seconds ends;
wherein a length of at least one strip-shaped elongated light guiding element along the first direction is less than a length of the strip-shaped elongated light guiding element along a second direction perpendicular to the first direction;
wherein the first ends are spaced apart from each other to define a space between adjacent strip-shaped interconnected elongated light guiding elements, and further wherein the plurality of strip-shaped interconnected elongated light guiding elements are cooperatively arranged to prevent the light beams emitted by the light source from entering the space between the first ends of adjacent strip-shaped interconnected elongated light guiding elements.

2. The lighting device according to claim 1, wherein at least the strip-shaped second ends of the elongated light guiding elements extend parallel to each other, wherein the elongated light guiding elements include at least one centrally located elongated light guiding element and at least two elongated light guiding elements with the second ends extending at different distances from the second end of the centrally located elongated light guiding element.

3. The lighting device according to claim 1, wherein at least the second ends of the elongated light guiding elements are ring-shaped strips located concentrically with respect to each other.

4. The lighting device according to claim 1, wherein at least a part of the elongated light guiding elements are at least connected to each other near the first and/or second ends.

5. The lighting device according to claim 1, wherein a light receiving surface of the first end of the elongated light guiding element extends substantially perpendicularly to the light beams of the light source directed towards said elongated light guiding element.

6. The lighting device according to claim 1, wherein the light exit surface has an oblique, convex or concave shape.

7. The lighting device according to claim 1, wherein the lens comprise acryl or polycarbonate.

8. The lighting device according to claim 1, wherein the area of the light exit surface of the lens is at least 10,000 times larger than the light emitting area of the light source.

* * * * *